United States Patent [19]

Tezuka et al.

[11] 4,281,914
[45] Aug. 4, 1981

[54] FOCAL PLANE SHUTTER

[75] Inventors: Nobuo Tezuka, Tokyo; Teiji Hashimoto, Kawasaki; Mitio Senuma, Tokyo; Yutaka Iwata, Chichibu, all of Japan

[73] Assignee: Canon Kabushiki Kaisha, Tokyo, Japan

[21] Appl. No.: 114,516

[22] Filed: Jan. 23, 1980

[30] Foreign Application Priority Data

Jan. 31, 1979 [JP] Japan .................................. 54-10177
Jan. 31, 1979 [JP] Japan ............................. 54-10919[U]

[51] Int. Cl.$^3$ ............................................. G03B 9/34
[52] U.S. Cl. ................................................. 354/244
[58] Field of Search ....................... 354/242, 243, 244

[56] References Cited

U.S. PATENT DOCUMENTS

| 3,739,704 | 6/1973 | Akiyama | 354/243 |
| 4,034,390 | 7/1977 | Urano et al. | 354/244 |
| 4,084,170 | 4/1978 | Hashimoto et al. | 354/244 X |

*Primary Examiner*—Donald A. Griffin
*Attorney, Agent, or Firm*—Toren, McGeady and Stanger

[57] ABSTRACT

Rollers having attached thereto ribbons of a shutter screen of a focal plane shutter are arranged to have either another roller or a shutter screen take-up shaft fitted therein with a frictional force provided between them. The rollers are provided with an engaging part for engagement with an external member. The degree of parallelism between the slit forming ends of the front and rear screens of the shutter forming a slit for exposure is adjustable by operating the external member to rotate the rollers with a force greater than the frictional force.

3 Claims, 4 Drawing Figures

FIG.3
FIG.4
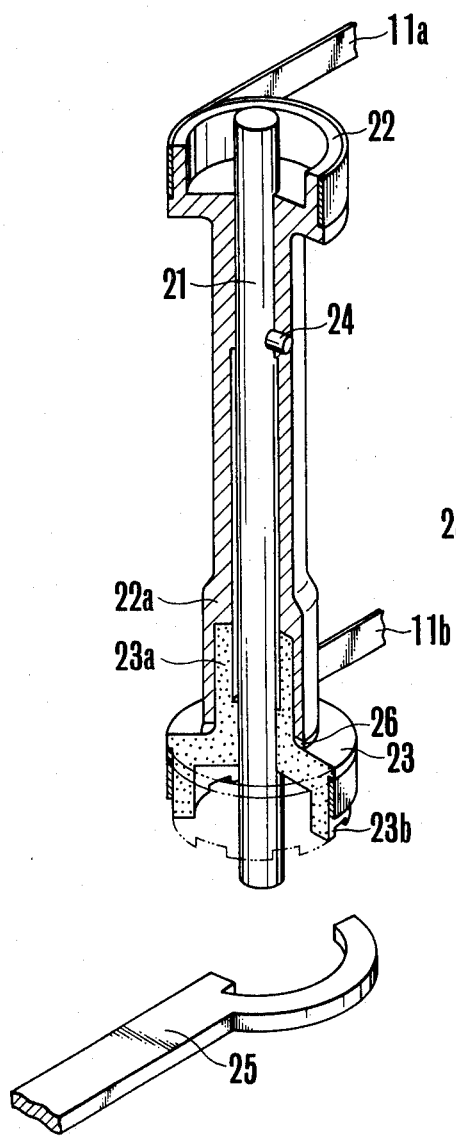
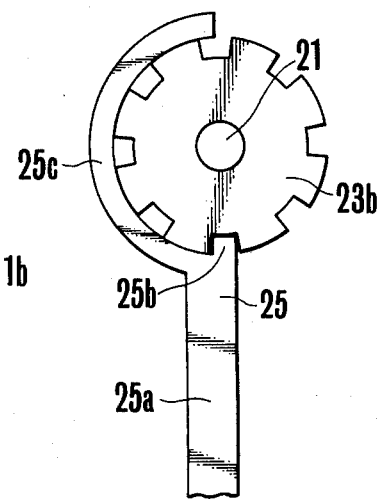

FOCAL PLANE SHUTTER

BACKGROUND OF THE INVENTION

1. Field of the Invention

This invention relates to a focal plane shutter which permits highly precise adjustment of the degree of parallelism between an end part of the front screen of the shutter and an end part of the rear screen of the shutter which form a slit between them for exposure.

2. Description of the Prior Art

As is well known, a focal plane shutter normally operates to form a slit between two screens which are made of rubber coated fabric or a metal and which are disposed immediately in front of a photographing film for exposing it to light.

Since the focal plane shutter is arranged to have the shutter screens travel at an approximately constant speed, the travelling speed of the slit formed by them is also fixed. Accordingly, the degree of film exposure to light is determined by electrically or mechanically varying the width of the slit to make it longer or shorter. However, since the width of the slit is determined by the end part of one shutter screen and that of the other shutter screen, one end of the slit and the other end of the slit will differ in width if the end part of one shutter screen is not parallel with that of the other shutter screen. In such a case, the upper side of a picture thus exposed on the film would have a different degree of exposure from the lower side thereof. To avoid such uneven exposure, therefore, the end part of one shutter screen must be adjusted to be in parallel with that of the other shutter screen.

Therefore, the parallelism between the end parts of the two shutter screens forming a slit has heretofore been adjusted, as shown in FIG. 1, when rollers 2 and 3 which are fixed to ribbons 1a and 1b are tightly secured to a front screen shaft 4 by means of screws 5a and 5b. Referring further to FIG. 1, a slit A is formed between the slit forming end part $1_1$ of a front shutter screen 1 and the slit forming end part $6_1$ of a rear shutter screen 6. However, if the slit forming end part $1_1$ should fail to be in parallel with the other slit forming end part $6_1$, the width of the slit A in the upper part thereof would differ from the width in its lower part. Therefore, in the final process of assembly of a shutter, these shutter screens have heretofore been adjusted to have their slit forming ends in parallel with each other by first attaching one of the rollers 2 and 3 and then attaching the other of the rollers 2 and 3 with the screws while effecting adjustment as required. However, in accordance with this method for adjusting the parallelism between the slit forming ends of the two shutter screens by tightening the screws 5a and 5b to fix the rollers 2 and 3 to the front shutter screen shaft 4, once the rollers 2 and 3 are tightly fixed to the front screen shaft by means of the screws 5a and 5b, tightening traces are left on the front shutter screen shaft. After that, in carrying out subsequent fine adjustment, when the rollers are slightly turned by loosening the screws 5a and 5b and then by again tightening the screws 5a and 5b, the traces produced by previous tightening impedes subsequent tightening of the screws 5a and 5b. Thus, it has been difficult to make fine adjustment in accordance with the above mentioned method. In view of this, in another method, instead of using the screws as shown in FIG. 1, the ribbons of the front screen are attached to the rollers with the slit forming ends of the shutter screens adjusted to be in parallel with each other to ensure that the slit has equal widths at its upper and lower ends. This adjustment is done before the adhesives for adhering the ribbons on the rollers are solidified. In the latter method for adjusting the parallelism, however, a spring force of the spring drum of the front shutter screen is exerted after the ribbons of the front screen are attached to the rollers to cause the connections between the ribbons and the rollers to deviate from their set positions. Therefore, it has also been difficult to make precise adjustment in accordance with the latter method.

SUMMARY OF THE INVENTION

It is an object of this invention to provide a focal plane shutter wherein the drawbacks of the conventional focal plane shutters are eliminated by arranging the rollers to which shutter ribbons are fixed to have either another roller or a shutter screen take-up shaft frictionally fitted therein with each of the rollers being arranged to be rotated by an external member for adjustment of the parallelism between the slit forming ends of the front and rear screens of the shutter.

It is another object of this invention to provide a focal plane shutter in which each of the above stated shutter ribbon fixing rollers is secured to another roller or to a take-up shaft and is thus arranged to be operable together therewith.

These and further objects, features and advantages of the invention will be apparent from the following detailed description of embodiments thereof taken in connection with the accompanying drawings.

BRIEF DESCRIPTION OF THE DRAWINGS

FIG. 3 is a partly sectional view showing an adjustment mechanism provided on a front screen shaft shown in FIG. 2.

FIG. 4 is an illustration of the engaging part of a second roller shown in FIG. 3 in relation to a tool.

DETAILED DESCRIPTION OF PREFERRED EMBODIMENTS

Figure 1:
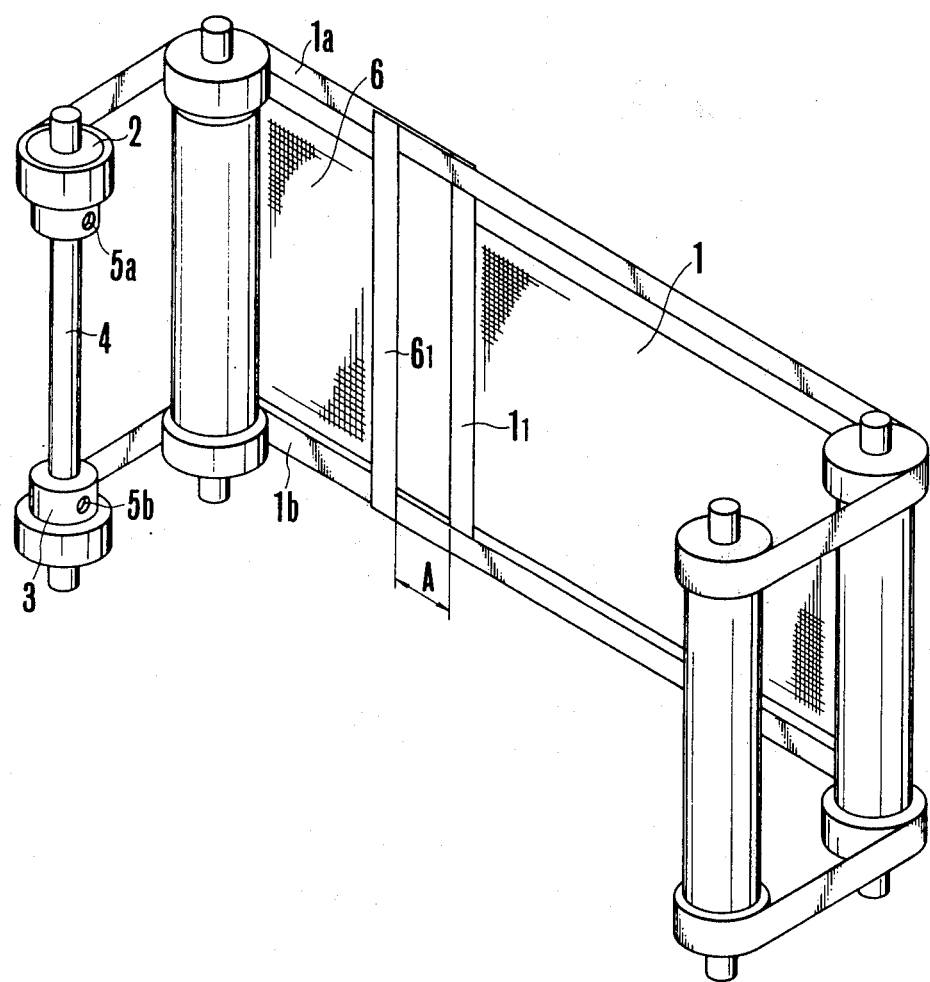
FIG. 1 is a perspective view showing the essential part of a conventional focal plane shutter.
Figure 2:
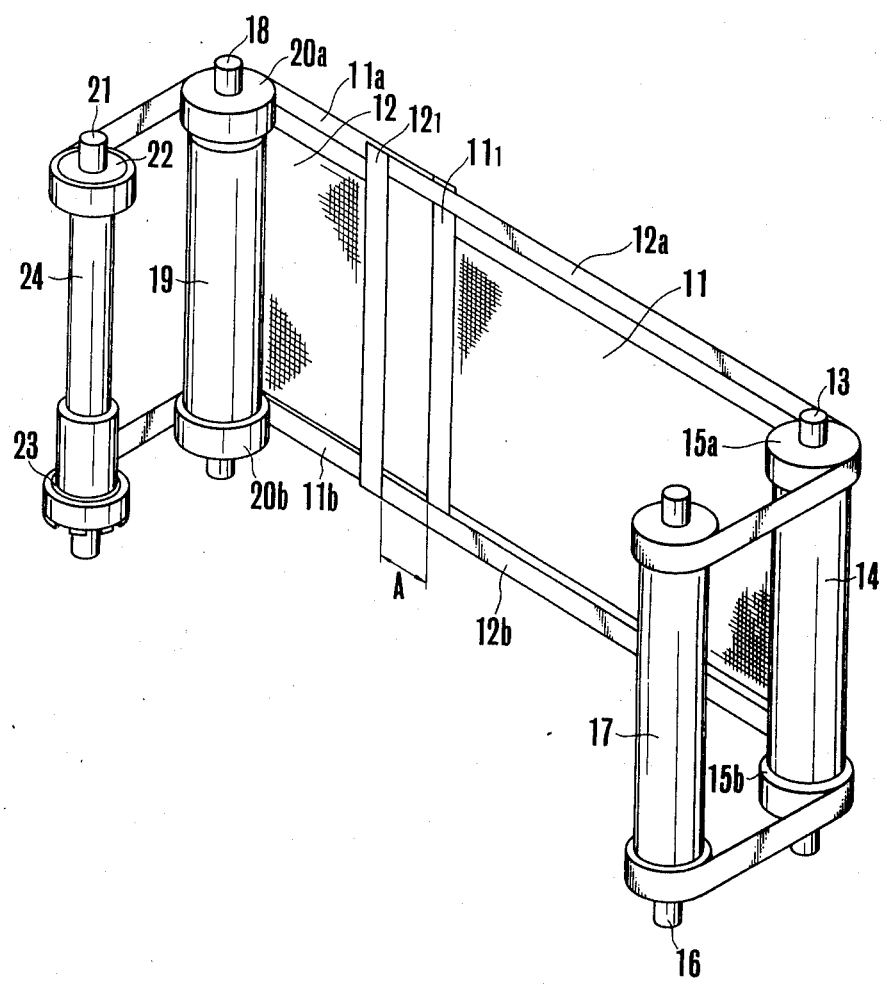
FIG. 2 is a perspective view showing the essential part of a focal plane shutter as an exemplary embodiment of the present invention.

An embodiment of the invention is described below with reference to the accompanying drawings. In FIG. 2 which shows the essential part of a focal plane shutter, a front screen 11 of the shutter is provided with ribbons 11a and 11b. A rear screen 12 of the shutter is provided with ribbons 12a and 12b. A slit A is formed between the slit forming end $11_1$ of the front screen 11 and the slit forming end $12_1$ of the rear screen 12. A shaft 13 is provided with a drum part 14 which is arranged to wind the front screen 11 thereon when the shutter travels and guide pulleys 15a and 15b which rotate independently of the drum part 14 to guide the ribbons 12a and 12b of the rear screen 12. Between the drum part 14 and the shaft 13, there is provided a spring which is not shown in the drawing but which is arranged to store energy when the shutter is charged. There is provided a shaft 16 equipped with a drum 17 which is arranged to wind up the ribbons 12a and 12b of the rear screen 12. Between this drum 17 and the shaft 16, there is provided a spring which is not shown but is arranged to store energy when the shutter is placed into a charged state. A shaft 18 is provided with a drum part 19 which winds the rear screen 12 thereon when the shutter is charged and guide pulleys 20a and 20b which rotate independently of the drum part 19 to guide the ribbons 11a and 11b of the front screen 11. Another shaft 21 is provided with first and second rollers 22 and 23 which have the fore ends of the ribbons 11a and 11b of the front screen 11 secured thereto and are arranged to wind these ribbons 11a and 11b thereon when the shutter is in a charged state. FIG. 3 shows the relation of the shaft 21 to the first and second rollers 22 and 23. Referring to FIG. 3, the shaft 21 is inserted through the first and second rollers 22 and 23. The first roller 22 is secured to the shaft 21 with a screw 24 to rotate together with the shaft 21. The first and second rollers 22 and 23 are respectively provided with extension parts 22a and 23a which have the shaft 21 extending therethrough piercing them. The extension part 23a is fitted between the shaft 21 and the extension part 22a with friction. The frictional force between them is arranged to be stronger than the force of the spring disposed between the drum part 14 and the shaft 13. The extension part 23a is disposed on one end face of the second roller 23 while the other end face of the second roller 23 is provided with an engaging part 23b which is arranged to permit a tool 25 provided as an external member to engage therewith. The tool 25 consists of a grip 25a, a protrusion 25b and a half-ring shaped part 25c. The engaging part 23b of the second roller has eight grooves as shown in FIG. 4. To engage the tool 25 with the engaging part 23b, the protrusion 25b is allowed to engage one of the eight grooves. Then, the half-ring shaped part 25c is put on the engaging part 23b along the periphery thereof. With the tool 25 thus fitted on the engaging part 23b, the tool 25 can be rotated to the left or right with a force stronger than the frictional force between the extension part 22a of the first roller 22 and the extension part 23a of the second roller 23 by grasping the grip 25a of the tool 25. After that, the first and second rollers 22 and 23 are joined together with an adhesive 26 to enable them to rotate together.

Next, in adjusting the degree of parallelism between the slit forming end $11_1$ of the front screen 11 and the slit forming end $12_1$ of the rear screen 12 during assembly of the shutter, the procedures required for the adjustment of the parallelism are as described below:

The parallelism between these slit forming ends $11_1$ and $12_1$ is adjusted during the final process of the shutter assembly. At this time, the extension part 22a of the first roller 22 and the extension part 23a of the second roller 23 have already been inserted in their places. The ribbon 11a of the front screen 11 of the shutter has been secured to the first roller 22 and ribbon 11b of the front screen to the second roller 23. The parallelism between the slit forming ends $11_1$ and $12_1$ is examined. If they are not in parallel with each other, the tool 25 is fitted onto the engaging part 23b of the second roller 23. Then, the tool 25 is rotated with a force stronger than the frictional force between the extension part 22a of the first roller 22 and the extension part 23a of the second roller 23. The amount of the ribbon 11b wound on the second roller 23 is adjusted with the rotation of the tool 25 and this adjustment of the ribbon 11b eventually effects adjustment of the slit forming end $11_1$ to make it parallel with the other slit forming end $12_1$. Further, the parallelism between these slit forming ends $11_1$ and $12_1$ is repeatedly examined several times under various conditions including the condition when the shutter is charged, the condition after completion of the travel of the shutter and the condition during the travel of the shutter. During this adjustment, since the frictional force between the extension part 22a of the first roller 22 and the extension part 23a of the second roller 23 is arranged to be stronger than the force of the spring disposed between the drum part 14 and the shaft 13, the adjusted parallelism remains unchanged through the subsequently repeated check up operations of charging the shutter and allowing the shutter to travel. With the check up operations repeated several times in this manner, any slight deviation from parallelism necessitates fine adjustment. To carry out the fine adjustment, the tool 25 is fitted onto the engaging part 23b of the second roller 23 in the same manner as described in the foregoing and the tool 25 is rotated with a force stronger than the frictional force between the extension part 22a of the first roller 22 and the extension part 23a of the second roller 23. By this, the amount of the ribbon 11b wound on the second roller 23 is adjusted and the slit forming end $11_1$ is slightly adjusted thereby to become parallel with the slit forming end $12_1$. Upon completion of the fine adjustment, the fore end of the extension part 22a of the first roller 22 and the second roller 23 are joined together with the adhesive 26 to make the first and second rollers 22 and 23 operative together. After this, the slit forming ends $11_1$ and $12_1$ retain the desired parallelism between them. To avoid exertion of even the slightest force thereon, the aforementioned joinder operation on the first and second rollers is performed with the shutter in a position after having completed travel.

In the embodiment described in the foregoing, the first roller 22 is secured to the shaft 21 with a screw 24. However, the first roller 22 may be secured to the shaft 21 by some suitable means other than the screw and, if so desired, it may be formed into one unified body together with the shaft 21.

In the embodiments described in the foregoing, ribbons are employed for the shutter screens. However, it will be apparent that in accordance with the invention the same adjustment is possible with cord or the like employed in place of the ribbons. Further, in the embodiments described in the foregoing, the arrangement of the invention is applied to focal plane shutters of a transverse travelling type. However, the same arrangement of the invention is of course applicable also to the focal plane shutter of a vertical travelling type. The adjusting method of the invention has been described in the foregoing as carried out by using the ribbons of the front screen of the shutter. However, it should be apparent that the same adjustment is also attainable by using the ribbons of the rear screen of the shutter.

As detailed in the foregoing, in accordance with the present invention, the rollers to which the shutter ribbons are secured are arranged to have either another roller or a shutter screen take-up shaft fitted thereon with a frictional force provided between them in such a manner that the rollers can be moved as desired by means of a tool for effecting, without fail, the fine adjustment of the parallelism between the slit forming end of the front screen and that of the rear screen of the shutter. In addition to this, it is another advantage of the invention that the workability of the shutter can be greatly improved in accordance with the present invention, because the ribbons can be fixed to the rollers prior to the adjustment work.

While specific embodiments of the invention have been shown and described in detail to illustrate the application of the inventive principles, it will be understood that the invention may be embodied otherwise without departing from such principles.

What is claimed is:

1. A focal plane shutter comprising: shutter screens each having two ribbons; a take-up shaft for winding each of said ribbons; a first roller rotatable together with said take-up shaft for winding one of said two ribbons thereon, said first roller being provided with an extension part; and a second roller having said take-up shaft extending therethrough and arranged to wind the other of said two ribbons thereon, said second roller being provided with an extension part which is fitted into said extension part of said first roller with a frictional force being developed therebetween exceeding a predetermined degree of force, said second roller including an engaging part which is arranged to permit an external member to engage therewith, said second roller being arranged such that when said external member is engaged with said engaging part and is operated to apply a force greater than said frictional force, said second roller is rotated thereby relative to said first roller to adjust the amount of said other ribbon wound thereon and in turn to adjust parallelism between the ends of said shutter screens.

2. A focal plane shutter according to claim 1 further including means for securing said first and second rollers to each other.

3. A focal plane shutter according to claim 1 wherein said first roller is formed unitarily with said take-up shaft.

* * * * *